(12) United States Patent
Nakanishi (10) Patent No.: US 6,671,422 B1
(45) Date of Patent: Dec. 30, 2003

(54) APPARATUS AND METHOD FOR DETECTING ROUGH POSITION OF TWO-DIMENSIONAL CODE

(75) Inventor: Fujio Nakanishi, Shiga-Ken (JP)

(73) Assignee: International Business Machine Corporation, Armonk, NY (US)

( * ) Notice: Subject to any disclaimer, the term of this patent is extended or adjusted under 35 U.S.C. 154(b) by 536 days.

(21) Appl. No.: 09/594,999

(22) Filed: Jun. 15, 2000

(30) Foreign Application Priority Data

Jun. 22, 1999 (JP) .......................................... 11-174937

(51) Int. Cl.$^7$ ................................................ G06K 9/36
(52) U.S. Cl. ...................... 382/291; 382/171; 382/190; 382/219; 382/282; 358/452; 358/453
(58) Field of Search ................................. 382/113, 135, 382/137, 139, 169, 170, 171, 175, 176, 190, 192, 193, 194, 195, 196, 201, 205, 209, 219, 217, 218, 278, 282, 291, 295, 103, 108, 237, 149, 151, 164, 165, 206, 251, 252, 255, 274, 275; 345/647, 648, 654, 616, 618; 358/1.5, 2.1, 3.03, 3.04, 26.3, 3.28, 488, 452, 447, 461, 463

(56) References Cited

U.S. PATENT DOCUMENTS

| 5,194,966 | A | * | 3/1993 | Quardt et al. | 358/406 |
|---|---|---|---|---|---|
| 5,260,807 | A | * | 11/1993 | Tai | 358/3.21 |
| 5,519,509 | A | * | 5/1996 | Hikosaka et al. | 358/3.03 |
| 5,604,605 | A | * | 2/1997 | Moolenaar | 358/3.03 |
| 5,818,971 | A | * | 10/1998 | Moolenaar et al. | 382/252 |
| 5,835,687 | A | * | 11/1998 | Brown et al. | 358/1.9 |
| 5,848,198 | A | * | 12/1998 | Penn | 382/276 |
| 5,979,763 | A | * | 11/1999 | Wang et al. | 235/462.17 |

* cited by examiner

Primary Examiner—Bhavesh M. Mehta
Assistant Examiner—Yosef Kassa
(74) Attorney, Agent, or Firm—Thomas A. Beck; Louis P. Herzberg (57) ABSTRACT

A computer readable program product for detecting the rough position of a two dimensional code included in image data, wherein the proportion of two dimensional code in each of small areas is determined by dividing the image data, and the small areas are then ranked based upon the proportions obtained.

9 Claims, 11 Drawing Sheets

APPARATUS AND METHOD FOR DETECTING ROUGH POSITION OF TWO-DIMENSIONAL CODE

FIELD OF THE INVENTION

The present invention relates to an apparatus and a method for reading a two-dimensional code. More particularly, it relates to an apparatus and a method for detecting the rough position of a two-dimensional code.

BACKGROUND OF THE INVENTION

Two-dimensional codes are used for process control of various parts. For example, labels with two-dimensional codes thereon are attached to parts for hard disks to carry out process control by the part. Further, two-dimensional codes may be formed on substrates of liquid crystal displays such as color filter substrates or array substrates by photolithographic process to carry out process control by the substrate. Process control of a color filter formed on a substrate may also be carried out by forming a two-dimensional code in the vicinity of the color filter.

Figure 11:
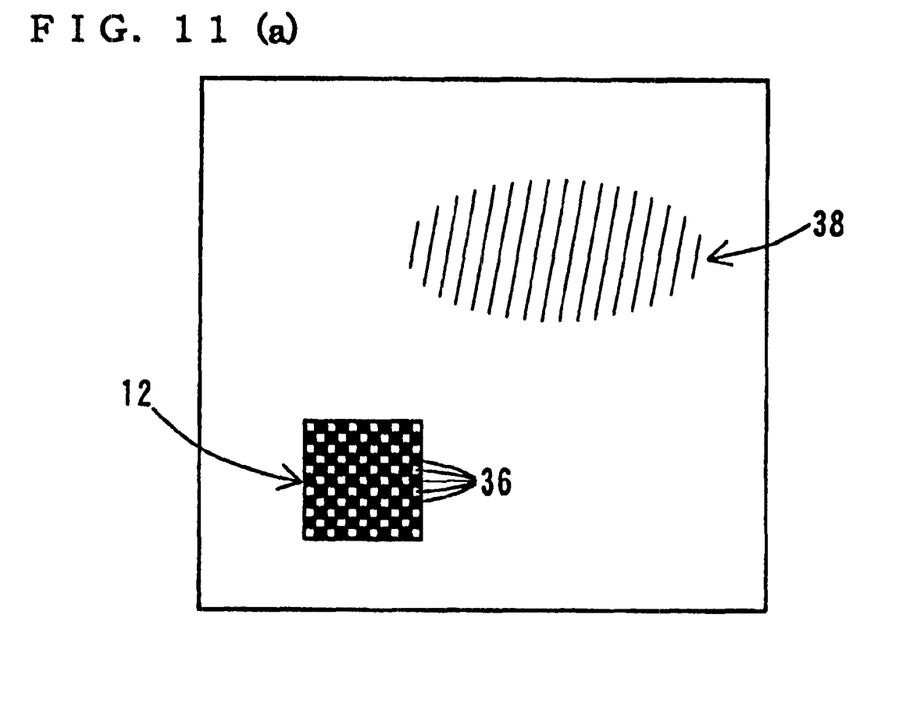
FIG. 11(a) illustrates an outline of the image data including a two-dimensional code.
FIG. 11(b) illustrates an outline of a conventional two-dimensional position detecting method.

FIG. 11(a) shows an example of a two-dimensional code. In the example of FIG. 11(a), a two-dimensional code 12 has such a shape that black and white colored cells 36 are arranged in a matrix form. Noise 38 may be included around the two-dimensional code 12. FIG. 11(b) shows image data 10 including the two-dimensional code 12 captured from a CCD (charge-coupled device) or the like. The two-dimensional code is extracted from this image data 10 to read the data by decoding the cells 36. To extract the two-dimensional code 12, it is, first of all, necessary to detect the position of the two-dimensional code 12.

As a code position detecting method, for example, scanning is performed at predetermined intervals as shown in FIG. 11(b). After the position of the two-dimensional code 12 is detected by the scanning, the code is extracted from the position. The position detecting method as shown in FIG. 11(b) will detect the perimeter of the two-dimensional code 12. In the detection of such perimeter, when noise such as noise 38 is included in the area of the captured image data 10, it is difficult to distinguish the perimeter of the two-dimensional code 12 from the perimeter of the noise. Further, it takes considerable time to perform scanning due to lots of scanning lines.

SUMMARY OF THE INVENTION

Therefore, it is an object of the present invention to provide an apparatus and a method for detecting the rough position of a two-dimensional code easily and at high speed. In one aspect of the present invention, an apparatus for detecting the rough position of a two-dimensional code included in image data is provided, which comprises means for detecting gray scale levels of pixels in image data divided into small areas, means for controlling the means for detecting gray scale levels so that the gray scale levels of the pixels on predetermined scanning lines set in the small areas can be detected, subtracting means for determining a difference between gray scale levels of two neighboring pixels which are adjacent to each other or are spaced at a predetermined interval on the scanning lines in the small areas, means for comparing the determined differences in gray scale level with a predetermined value, means for counting the number of the differences in gray scale level which are equal to or greater than the predetermined value, and means for ranking the small areas based upon the count obtained.

The present invention also provides methods for detecting the rough position of a two-dimensional code included in image data, which, in one aspect, comprises the steps of determining a proportion of the two-dimensional code in each of small areas obtained by dividing the image data, and ranking the small areas based upon the proportions obtained.

In another aspect of the present invention, the method for detecting the rough position of a two-dimensional code according to the present invention comprises the steps of determining a proportion of the two-dimensional code in each of small areas obtained by dividing each of medium areas obtained by the division of the image data, ranking the small areas for each medium area based upon the proportions obtained, and determining the ranking of all the small areas on the basis of the ranking of the small areas determined for each medium area.

BRIEF DESCRIPTION OF THE DRAWINGS

These and other objects, features, and advantages of the present invention will become apparent upon further consideration of the following detailed description of the invention when read in conjunction with the drawing figures, in which.

REFERENCE CHARACTERS OF DRAWINGS

10, 20: IMAGE DATA
12, 22: TWO-DIMENSIONAL CODE
14, 24: SMALL AREA
26: MEDIUM SIZE AREA
30: SCANNING LINE

32: TARGET PIXELS WHOSE DIFFERENCES IN GRAY SCALE LEVEL TO BE DETERMINED
36: CELL
38: NOISE
40: CONTROL SECTION
42: COUNTING CIRCUIT
44: ARITHMETIC CIRCUIT
46: COMPARISON CIRCUIT
50: RANK DETERMINING SECTION
54: SCANNING CONTROL SECTION
58: GRAY SCALE LEVEL DETECTING SECTION
60: COMPLEXITY MEMORY SECTION

DETAILED DESCRIPTION OF THE INVENTION

Figure 2:
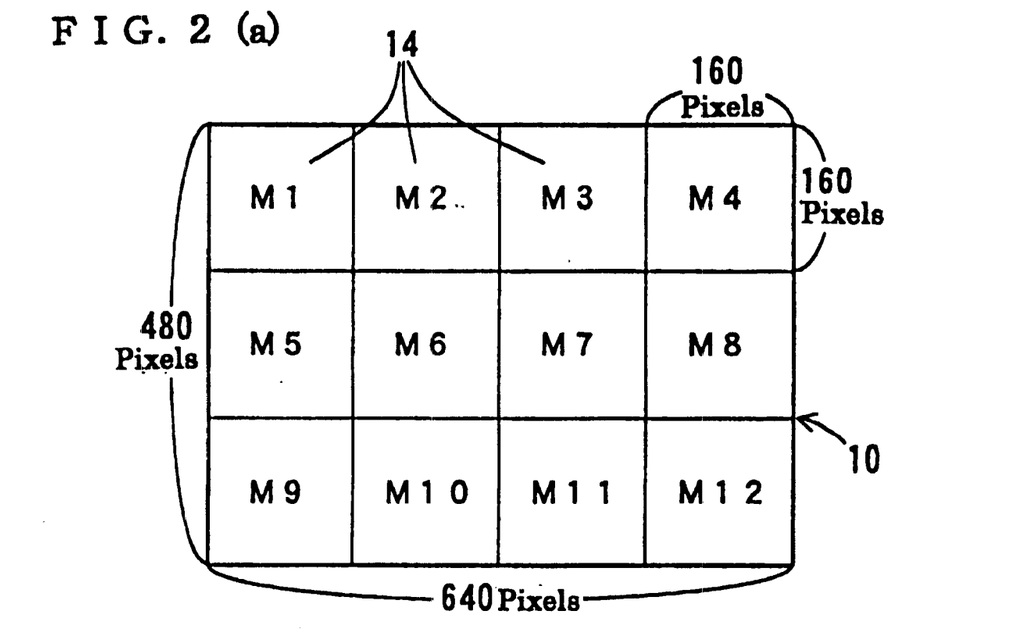
FIGS. 2(a) and 2(b) show an example of image data including a two-dimensional code wherein the image data has been divided into small areas.

Now, a preferred embodiment of the apparatus and method for detecting the rough position of a two-dimensional code according to the present invention will be described in detail on the basis of accompanying drawings. As shown in FIGS. 2(a) and 2(b), this embodiment is explained by exemplifying image data 10 having 640 pixels×480 pixels. The image data 10 has 256 gray scales, wherein each pixel will have one of 0 to 256 gray scale levels. When a two-dimensional code 12 is relatively large compared to the image data 10, the image data 10 may be divided into small areas 14 (M1 to M12) having 160 pixels×160 pixels, for example.

Figure 1:
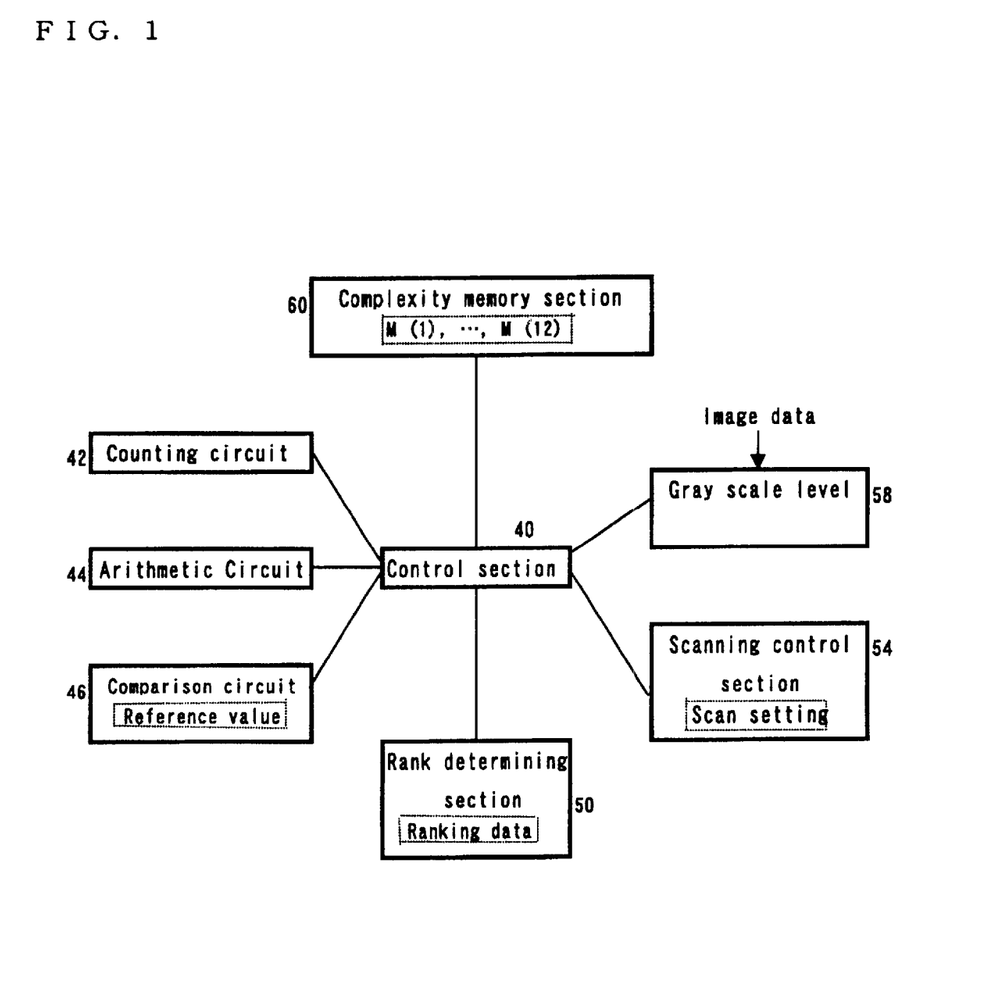
FIG. 1 is a block diagram for showing an example of an apparatus for detecting the rough position of a two-dimensional code according to the present invention.

FIG. 1 is a block diagram for an example of an apparatus for detecting the rough position of a two-dimensional code according to the present invention. The apparatus for detecting the rough position comprises a scanning control section 54, a gray scale level detecting section 58, a counting circuit 42, an arithmetic circuit 44, a comparison circuit 46, a complexity memory section 60, a rank determining section 50, and a control section 40. The gray scale level detecting section 58 determines gray scale levels of the image data 10. The scanning control section 54 is used for determining the gray scale levels of predetermined pixels by controlling the gray scale level detecting section 58 through the control section 40. Detection control of such gray scale levels is performed on the basis of the scan setting in the scan control section 54. For example, as shown in FIGS. 3(a) and 3(b), four scanning lines 30 are set in each of the small areas 14, and the gray scale level of each pixel on the scanning lines 30 is detected.

Figure 3:
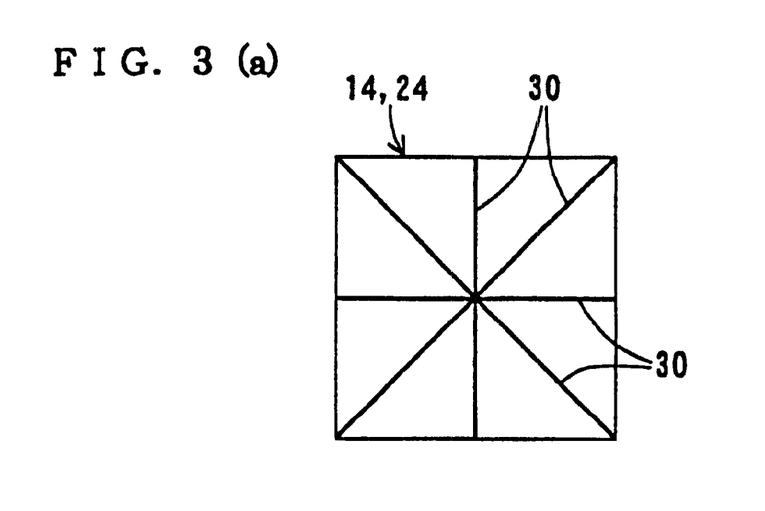
FIGS. 3(a) and 3(b) show an example of scanning lines set in small areas and pairs of pixels on the scanning lines, where a difference in gray scale level between each of pairs of neighboring pixels is to be determined.

The arithmetic circuit 44 has at least a subtraction function and operates to determine the difference in gray scale level between each of pairs of neighboring pixels 32 on the scanning lines 30 as indicated in FIG. 3(b). The comparison circuit 46 compares the differences in gray scale level with a predetermined value. The counting circuit 42 increments the count by 1 each time the difference in gray scale level is greater than the predetermined value. The complexity memory section 60 saves the count for each of the small areas when scanning is terminated. This count is also referred to as "complexity" in the present invention. The rank determining section 50 determines the ranking of the small areas (M1–M12) according to the degree of complexity of each small areas (M(1)–M(12)). Complexity M(i) indicates the degree of changes in gray scale level in a small area. The two-dimensional code consists of black and white cells, and will give a greater degree of changes in gray scale level than background. Thus, as the two-dimensional code forms a greater proportion of the area of a small area, that is, the ratio of an area which the code takes in a small area to the area of the small area is higher, the complexity of the small area is assumed to be higher. Accordingly, it is considered that the small area with higher complexity includes a greater proportion of the two-dimensional code, which will indicate the rough position of the two-dimensional code.

Figure 4:
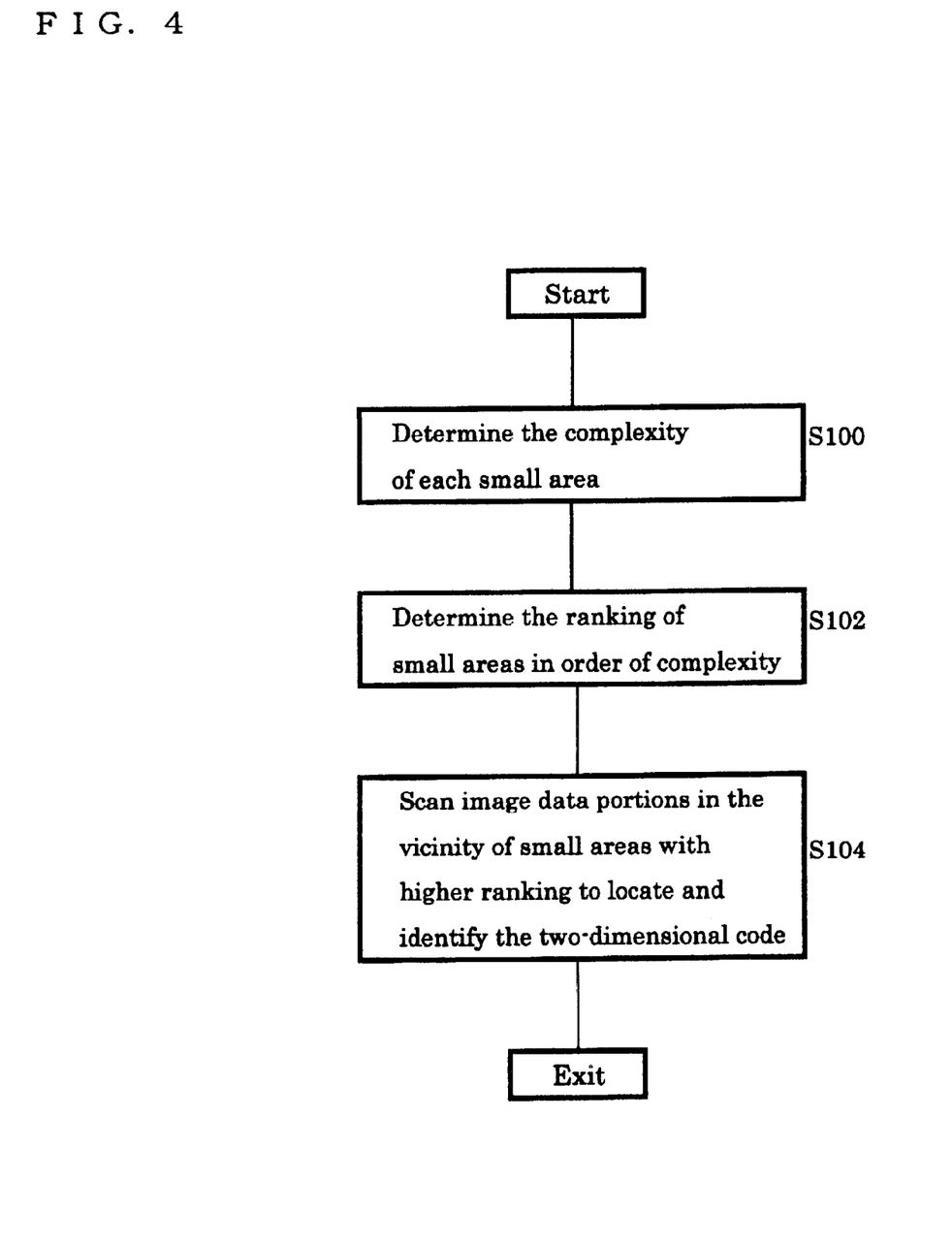
FIG. 4 is a flow chart for showing an example of detecting the rough position of a two-dimensional code according to the present invention.

Now, the detecting procedures of the rough position of a two-dimensional code will be described in detail. FIG. 4 shows an outline of the two-dimensional code reading procedure employing the apparatus and method for detecting the rough position of a two-dimensional code according to the present invention. First, determine the complexity (M(1) to M(12)) of each small area (M1 to M12) of the image data 10 captured from a CCD or the like (S100). M(i) is the complexity of a small area Mi (i=1 to 12).

The complexity of each small area can be, for example, determined according to procedure illustrated in FIG. 5 as described below. Reset the count of the counting circuit 42 (S110) to start scanning (S112). In the scanning operation, detect sequentially gray scale levels of the pixels on each of the four scanning lines 30 shown in FIGS. 3(a) and 3(b) (S114). Determine a difference between the gray scale level obtained for the previous pixel and the gray scale level obtained for the current pixel (S116). The previous and current pixels are adjacent to each other along the scanning line 30 as shown by reference numeral "32" in FIG. 3(b). However, when the first gray scale level of each scanning line 30 is detected, the difference in gray scale level is not calculated due to no previous detection value to be compared. Next, compare the difference in gray scale level with a predetermined value (S118). When the gray scale level is equal to or greater than the predetermined value, increment the count by 1 (S120). Save the gray scale level obtained for the current pixel (S126), and then detect the gray scale level of the next pixel (S114). Similar steps are repeated to obtain the gray scale level difference and perform a comparison between the difference and the predetermined value for all the pairs of neighboring pixels on each scanning line 30. When the scanning for the four scanning lines 30 is completed (S122), save the count (S124).

Next, determine the ranking of the small areas in order of the complexity in FIG. 4 (S102). The small areas with higher ranking may be regarded as candidates for the rough position of the two-dimensional code. Starting with the small area with the highest ranking, image data portions in the vicinity of each of the small areas with higher ranking are scanned to locate and identified the two-dimensional code (S104). For example, when the complexity is ranked as M(8)>M(3)>M(11)>M(6)>M(4)>M(1)>M(12)>M(9)>M(5)>M(2)>M(7)>M(10), image data portions in the vicinity of the small area M8 are first scanned.

Since fewer scanning lines (FIG. 3(a)) are used in the present invention compared to conventional scanning lines (FIG. 11(b)), the scanning time becomes shorter. Further, the complexity representing the degree of changes between white and black is detected instead of detecting the perimeter of the two-dimensional code as in the prior art. In general, the complexity of the two-dimensional code is considered to be higher than that of noise because of more changes between white and black contained in the two-dimensional code than in noise. For this reason, the two-dimensional code can be usually distinguished from noise.

The small areas having complexity equal to or lower than a predetermined value may be excluded from the ranking when determining the ranking of the small areas. If the number of the small areas to be ranked becomes fewer, the process for ranking the small area is simplified and sped up. In the image data 10 shown in FIG. 2(b), the small areas will be ranked in the order of M(10)>M(6)>M(9)>M(5)>M(7)>M(11). The image data 10 may, however, have a possibility of including noise in addition to the two-dimensional code 12. Since the complexity of the two-dimensional code is usually higher than that of noise as stated above. Small areas including portions of the two-dimensional code will be ranked higher than the small areas including noise. Even if the complexity by noise is given higher ranking, it is possible to distinguish between the two-dimensional code and noise based upon the respective shapes, rectangle shape for the code and indefinite, non-rectangle shape for noise. The shape of an image can be identified by detecting the outer shape line or contour line of the image when the image data is scanned in the step S104 in FIG. 4 to locate and identify the two-dimensional code.

In this manner, the image data including a two-dimensional code is divided into small areas to determine the complexity representing a proportion of the two-dimensional code in each small area. Then the rough position of the two-dimensional code can be determined easily and at high speed by regarding the small areas with higher complexity as candidates for the rough position of the two-dimensional code. According to the present invention, the time required for detecting the rough position of the two-dimensional code and locating the code may be reduced. After the determination of the rough position and the detection of the outer shape line of the two-dimensional code, the values of the cells in the code (e.g. white color is "0", black color is "1") are read on the basis of the coordinates of the obtained outer shape line, as is known in the art.

Figure 6:
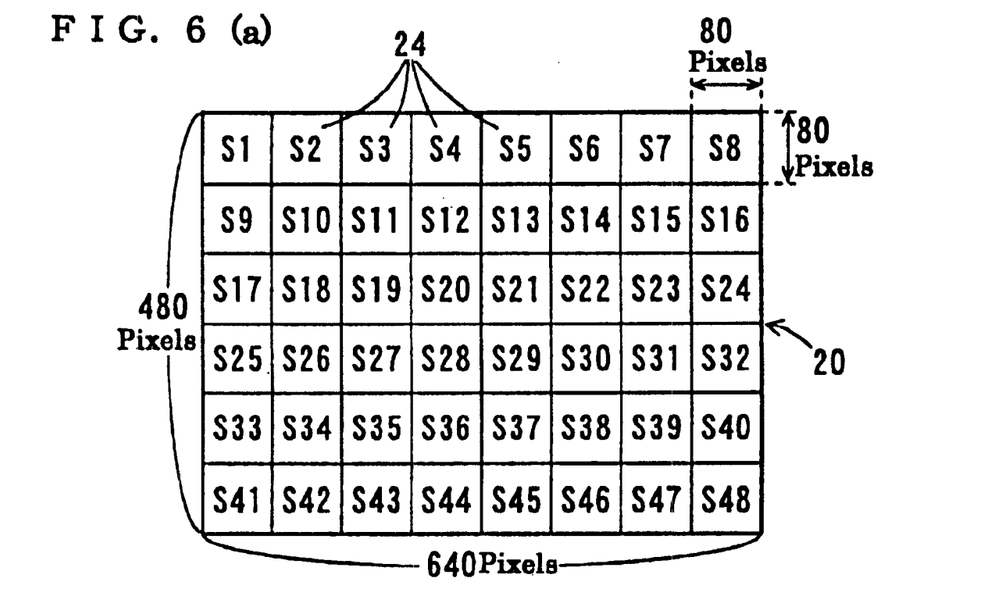
FIGS. 6(a) and 6(b) show another example of image data including a two-dimensional code where the image data is divided into small areas.
Figure 7:
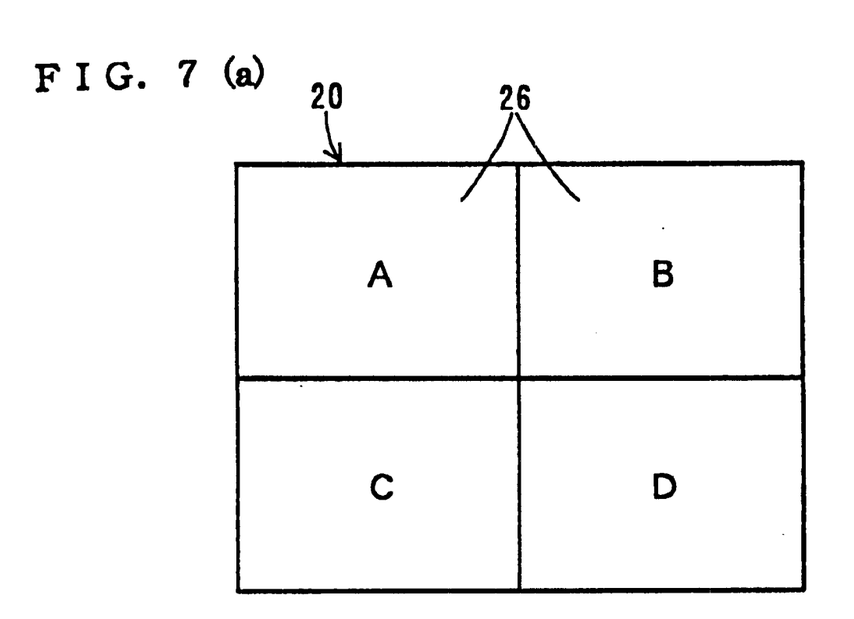
FIGS. 7(a) and 7(b) show an example of image data including a two-dimensional code where the image data is divided into medium areas which are in turn divided into small areas.

When a two-dimensional code 22 is relatively small compared to image data 20, as shown in FIGS. 6(a) and 6(b), the image data 20, for example, can be divided into small areas 24 (S1 to S48) having 80 pixels×80 pixels. When the number of the small areas, however, is increased, it takes much time to determine their ranking. In such cases as shown in FIG. 7(a), the image data 20 may be divided into medium size areas 26 (A, B C, and D), which may be further divided into small areas 24 (A1 to A12, B1 to B12, C1 to C12, and D1 to D12).

Figure 5:
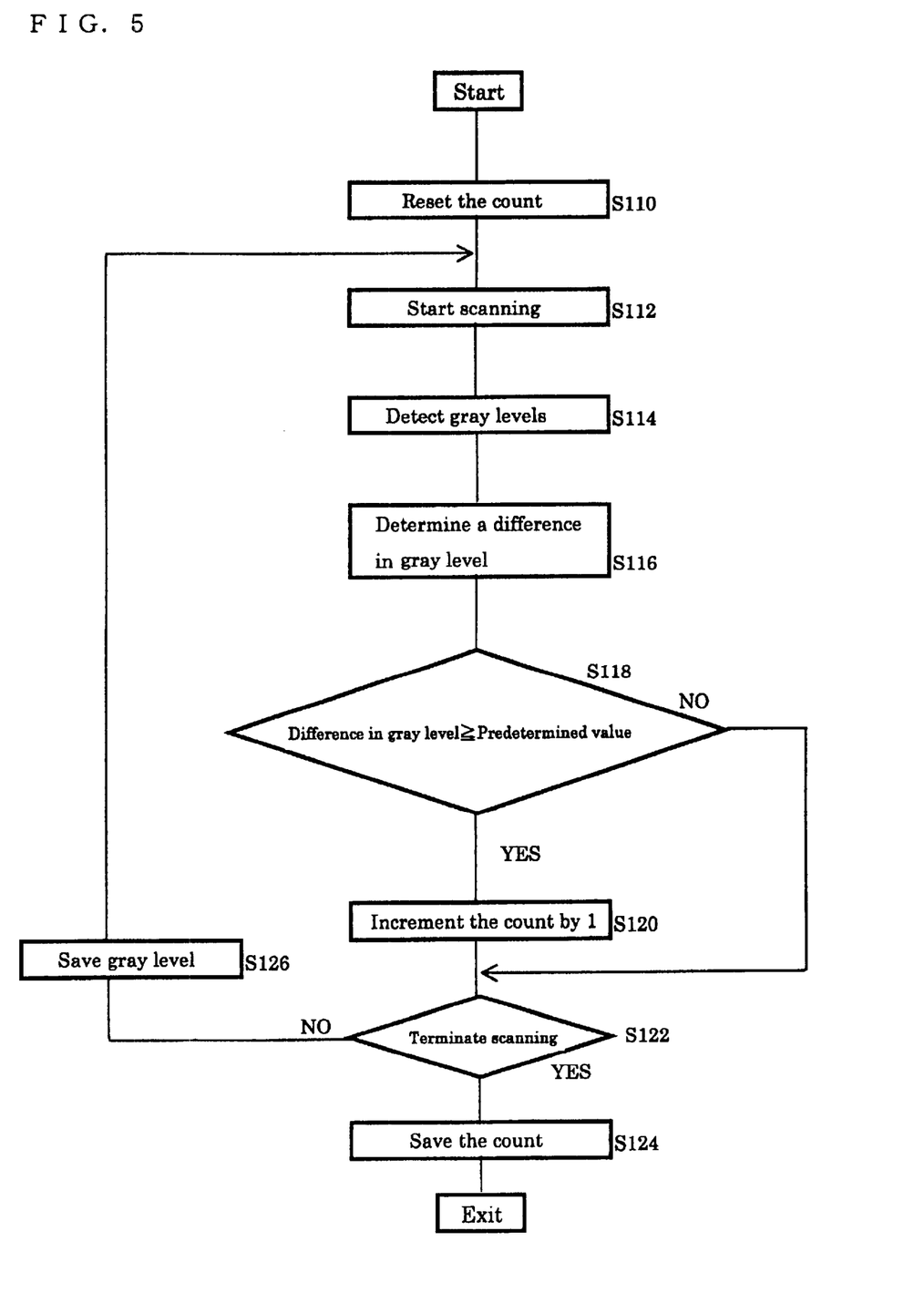
FIG. 5 is a flow chart for showing an example of how to determine image complexity according to the present invention.

The complexity (A(1), . . . , D(12)) of each small area (A1, . . . , D12) can be determined in similar procedure to that shown in FIG. 5. The ranking of small areas (A1, . . . , D12) can be, for example, determined by the procedure shown in FIG. 8. First, determine the ranking of small areas for each medium area (S130).

Figure 8:
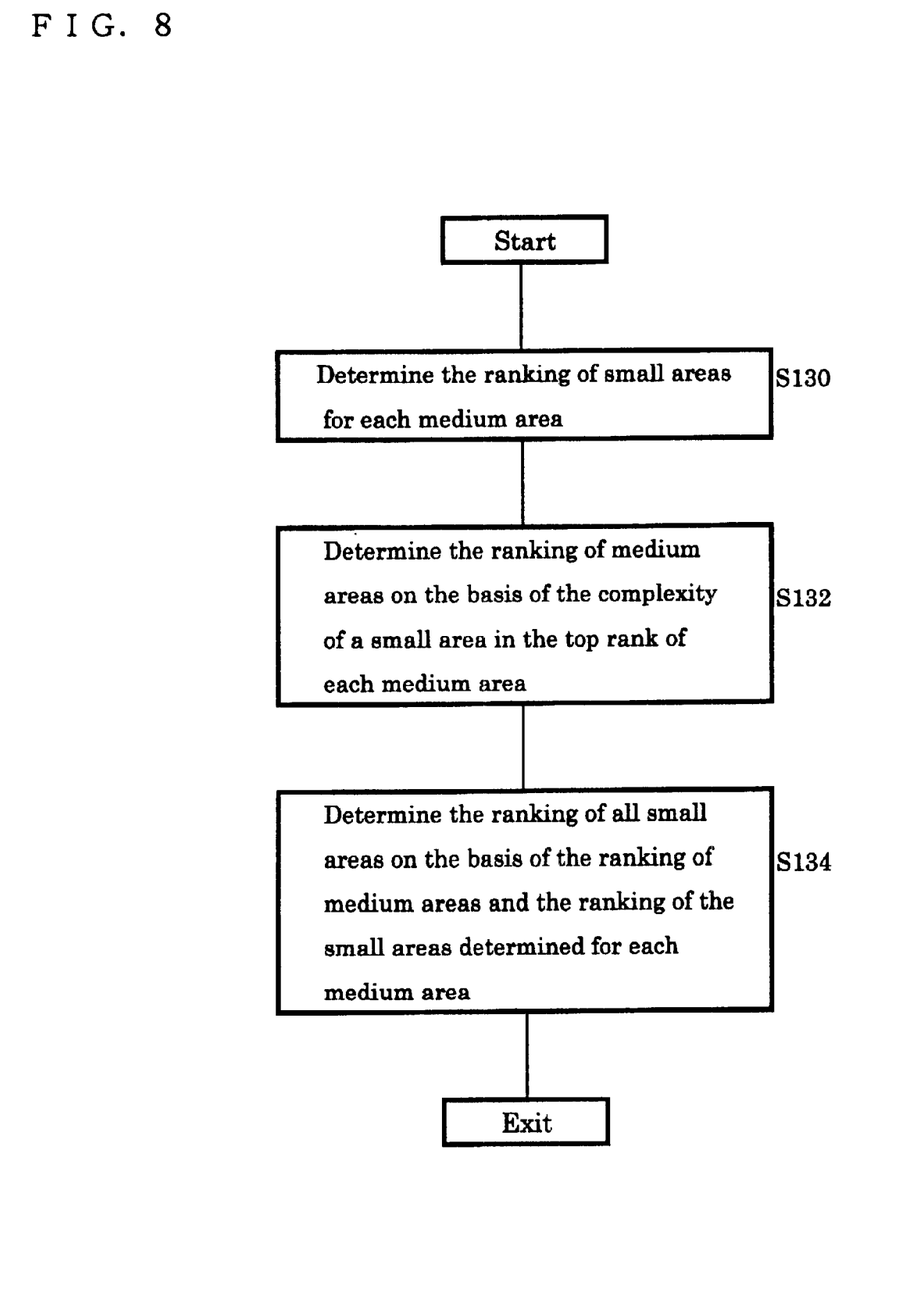
FIG. 8 is a flow chart for showing an example on how to determine the ranking of small areas obtained by dividing medium areas.

For example, assume that the ranking in the medium area A as follows:

A(10)>A(7)>A(2)>A(5)>A(9)>A(12)>A(1)>A(4)>A(6)>A(11)>A(3)>A(8).

The ranking in the medium area B is assumed as follows:
B(4)>B(6)>B(11)>B(1)>B(12)>B(2)>B(3)>B(9)>B(10)>B(5)>B(7)>B(8).

The ranking in the medium area C is assumed as follows:
C(2)>C(8)>C(12)>C(6)>C(11)>C(5)>C(4)>C(10)>C(7)>C(1)>C(9)>C(3).

The ranking in the medium area D is assumed as follows:
D(11)>D(1)>D(8)>D(3)>D(2)>D(6)>D(5)>D(12)>D(9)>D(4)>D(10)>D(7)

Next, determine the ranking of the medium areas on the basis of the complexity of the small area in the top rank in each medium area (S132). For example, it is assumed that the complexity of the small areas (A10, B4, C2, and D11) in the top rank of each medium area (A, B, C, and D) is B(4)>C(2)>A(10)>D(11). In this case, the ranking of the medium areas is determined as follows:

B>C>A>D.

Next, determine the ranking of all small areas on the basis of the ranking of the medium areas and the small areas determined for each medium area (S134). More specifically, subsequent to the ranking of the small areas in the top rank in each medium area of B(4)>C(2)>A(10)>D(11), the small areas (A7, B6, C8, and D1) in the second rank from the top of each medium area are similarly ranked as B>C>A>D. More precisely, the ranking is determined as follows:

B(4)>C(2)>A(10)>D(11)>B(6)>C(8)>A(7)>D(1).

Similarly, subsequent to the ranking determined before, the small areas in the third to twelfth rank are ranked in order as B>C>A>D. Thereby, the small areas are ranked as follows:

B(4)>C(2)>A(10)>D(11)>B(6)>C(8)>A(7)>D(1)> . . . . >B(8)>C(3)>A(8)>D(7).

The scanning to locate and identify the two-dimensional code is performed in order of the small area ranking, starting with the small area in the top rank B(4), as described with reference to the step S104 in FIG. 4.

With the use of fewer scanning lines (FIG. 3(a)) in the present invention compared to conventional scanning lines (FIG. 11(b), scanning time becomes shorter. Further, the determination of the ranking of small areas in order of the ranking of the medium areas will enable the rapid detection of the rough position of the two-dimensional code.

Instead of determining the ranking of the small areas based upon the ranking of the medium areas which is determined only once at first as stated above, the ranking of the small areas may be determined for each group of four small areas of corresponding rank, one from each medium area. For example, if the ranking of each group of four small areas in the same rank is as given below, B (4) > C (2) > A (10) > D (11)
A (7) > B (6) > D (1) > C (8)
.
.
.
D (7) > B (8) > C (3) > A (8), the ranking of all the small areas will be as follows:
B(4)>C(2)>A(10)>D(11)>A(7)>B(6)>D(1)>C(8)> . . . >D(7)>B(8)>C(3)>A(8).

It is also possible not to include small areas with complexity equal to or lower than a predetermined value when determining the ranking of small areas. The fewer the number of small areas to be ranked, the shorter the processing time for the ranking. In the image data shown in FIG. 6(b), the ranking will be ideally as follows:

D(1)>D(2)>D(5)>>B(10)>D(6)>C(4)>A(12)>C(8)

The image data may include noise in addition to the two-dimensional code. However, it is possible to distinguish between the two-dimensional code and noise, as mentioned above.

In this manner, image data including a two-dimensional code is divided into medium areas and the medium areas are further divided into small areas to determine the complexity representing a proportion of the two-dimensional code in the small areas. Small areas with higher complexity are regarded as representing the rough position of the two-dimensional code. This method enables the position of the two-dimensional code to be determined easily and at high speed. Further, the two-level ranking by small and medium areas is suitable for use in cases where the image data may contain noise.

As described above, one of embodiments in the present invention has been described in detail. The apparatus and method for detecting the rough position of a two-dimensional code according to the present invention may also be implemented in other embodiments. For example, image data can be used in an arbitrary size and shape. Further, the size and shape of each small area may be arbitrary. Similarly, the size, shape, and number of medium areas may be set arbitrarily. Furthermore, the two-dimensional code of which rough position is to be determined may be any type of two-dimensional code and a similar code to the two-dimensional code.

Figure 9:
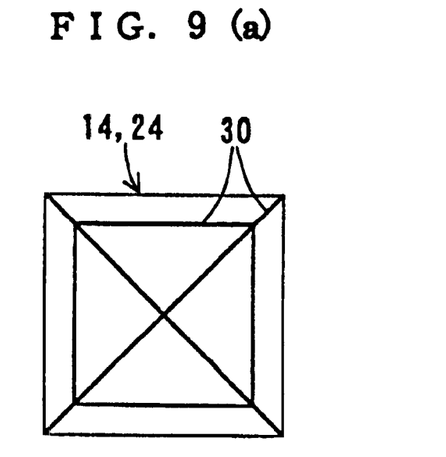
FIGS. 9(a) to 9(f) show other examples of scanning lines set in small areas.
Figure 10:
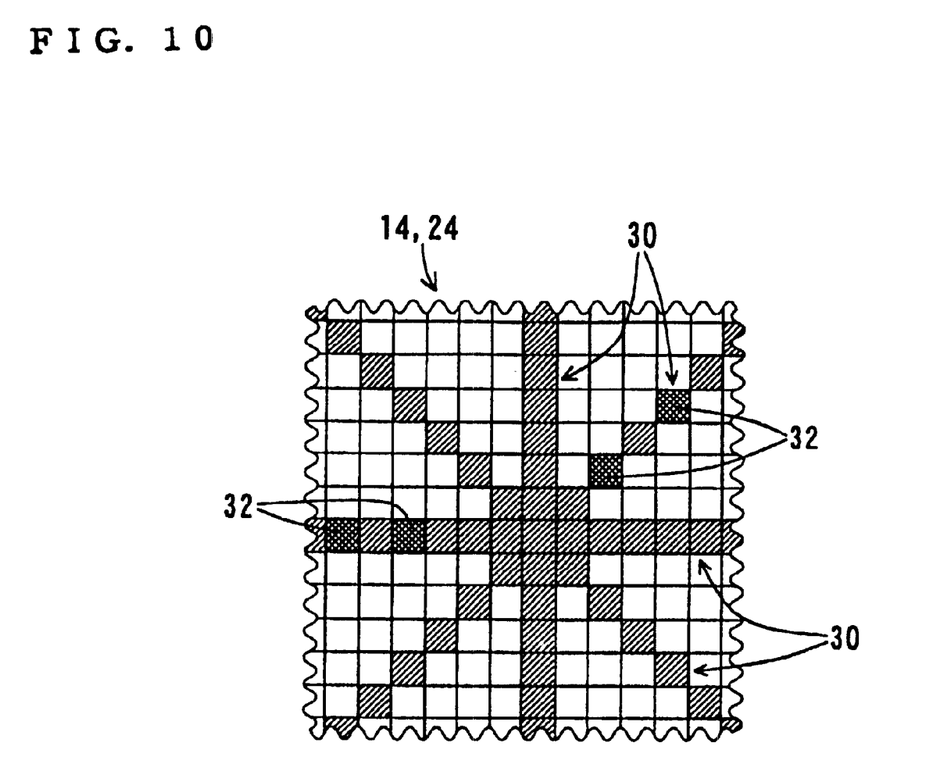
FIG. 10 shows other example of target pixels whose gray scale levels are to be determined.

As shown in FIG. 9, scanning lines 30 can be set suitably according to the size and shape of the small areas, and the size, shape and kind of the two-dimensional code. As shown in FIG. 10, a difference in gray scale level of two pixels 32 spaced at a predetermined interval on scanning lines 30 can also be determined. In FIG. 10, a difference in gray scale level between two pixels spaced at one pixel interval is determined.

While the embodiment of the present invention has thus been described with reference to the drawings, it should be understood that the present invention be not limited to the embodiment exemplified or illustrated in the drawings. Various modifications, alterations and changes may be made to the embodiment on the basis of knowledge of those skilled in the art without departing from the scope of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. An apparatus for detecting the rough position of a two-dimensional code included in image data, comprising:
   means for determining a proportion of said two-dimensional code in each of small areas obtained by dividing said image data;
      wherein said means for determining said proportion includes: means for determining a difference in gray scale level between two neighboring pixels which are adjacent to each other or are spaced at a predetermined interval on predetermined scanning lines set in small areas; wherein
      said means for determining a difference in gray scale level includes means for detecting gray scale levels of pixels in said image data; and
      means for controlling the means for detecting gray scale levels to detect gray scale levels of pixels on said scanning lines; and
      subtracting means for determining a difference between gray scale levels of two neighboring pixels which are adjacent to each other or are spaced at a predetermined interval on said scanning lines in said small areas; and
      means for counting the number of the differences in gray scale level which are equal to or greater than a predetermined value and
   means for ranking said small areas based upon the proportions obtained.

2. The apparatus for detecting the rough position of a two-dimensional code according to claim 1 wherein said means for counting includes:
   means for comparing the determined differences in gray scale level with the predetermined value; and
   means for counting the number of the differences in gray scale level which are greater than the predetermined value; and
   said means for ranking said small areas ranks only said small areas with their proportions being higher than a predetermined value.

3. A method for detecting the rough position of a two-dimensional code included in image data, comprising the steps of:
   determining a proportion of said two-dimensional code in each of small areas obtained by dividing said image data;
      wherein the step of determining said proportion includes the steps of determining a difference in gray scale level between two neighboring pixels which are adjacent to each other or which are spaced at a predetermined interval on predetermined scanning lines in small areas;
      said step of determining a difference in gray scale level including the steps of determining said gray scale level of pixels on predetermined scanning lines set in small areas; and
      determining a difference in gray scale levels between two neighboring pixels which are adjacent to each other or which are spaced at a predetermined interval on said scanning lines in said small areas;
      said step of determining a difference in gray scale levels including the steps of:
         determining the gray scale levels of pixels between two neighboring pixels on predetermined scanning lines set in small areas; and
         determining a difference in gray scale levels between two neighboring pixels which are adjacent to each other or are spaced at a predetermined interval on the scanning lines in the small areas counting the number of differences in gray scale level which are equal to or greater than a predetermined value;
         said step of counting the number of differences including the steps of: comparing the determined differences in gray scale level with a predetermined value and counting the number of differences in gray scale level which are greater than the predetermined value and
   ranking said small areas based upon the proportions obtained, wherein said step of ranking said small areas ranks only the small areas with their proportions being higher than a predetermined value.

4. An article of manufacture comprising a computer usable medium having computer readable program code means embodied therein for causing detection of the rough position of a two-dimensional code included in image data, the computer readable program code means in said article of manufacture comprising computer readable program code means for causing a computer to effect the steps of claim 3.

5. A computer program product comprising a computer usable medium having computer readable program code means embodied therein for causing detection of the rough position of a two-dimensional code included in image data, the computer readable program code means in said computer program product comprising computer readable program code means for causing a computer to effect the steps of claim 3.

6. A method for detecting the rough position of a two-dimensional code included in image data, comprising the steps of:

determining a proportion of said two-dimensional code in each of small areas obtained by dividing each of medium areas obtained by the division of said image data;

wherein the step of determining said proportion includes the steps of:

determining a difference in gray scale level between two neighboring pixels which are adjacent to each other or which are spaced at a predetermined interval on predetermined scanning lines in small areas;

counting the number of differences in gray scale level which are equal to or greater than a predetermined value;

wherein said step of counting the number of differences including the steps of: comparing the determined differences in gray scale level with a predetermined value and counting the number of differences in gray scale level which are greater than the predetermined value     and determining the ranking of all said small areas on the basis of the ranking of said small areas determined for each medium area, wherein         the step of determining said ranking of said small areas ranks only said small areas with their proportions being higher than a predetermined value.

7. An article of manufacture comprising a computer usable medium having computer readable program code means embodied therein for causing detection of the rough position of a two-dimensional code included in image data, the computer readable program code means in said article of manufacture comprising computer readable program code means for causing a computer to effect the steps of claim 6.

8. A computer program product comprising a computer usable medium having computer readable program code means embodied therein for causing detection of the rough position of a two-dimensional code included in image data, the computer readable program code means in said computer program product comprising computer readable program code means for causing a computer to effect the steps of claim 6.

9. A computer program product comprising a computer usable medium having computer readable program code means embodied therein for causing detection of the rough position of a two-dimensional code included in image data, the computer readable program code means in said computer product comprising computer readable program code means for causing a computer to effect:

means for determining a proportion of said two-dimensional code in each of small areas obtained by dividing said image data;

means for ranking said small areas based upon the proportions obtained;

"wherein said means for determining said proportion includes:

means for determining a difference in gray scale level between two neighboring pixels which are adjacent to each other or are spaced at a predetermined interval on scanning lines in small areas;

means for counting the number of the differences in gray scale level which are equal to or greater than a predetermined value; and     said means for counting including:

means for comparing the determined difference in gray scale level with a predetermined value and         means for counting the number of differences in gray scale level which is greater than the predetermined value."

\* \* \* \* \*